(No Model.)
S. D. REYNOLDS.
DELIVERY WAGON.
No. 500,212.
2 Sheets—Sheet 2.
Patented June 27, 1893.
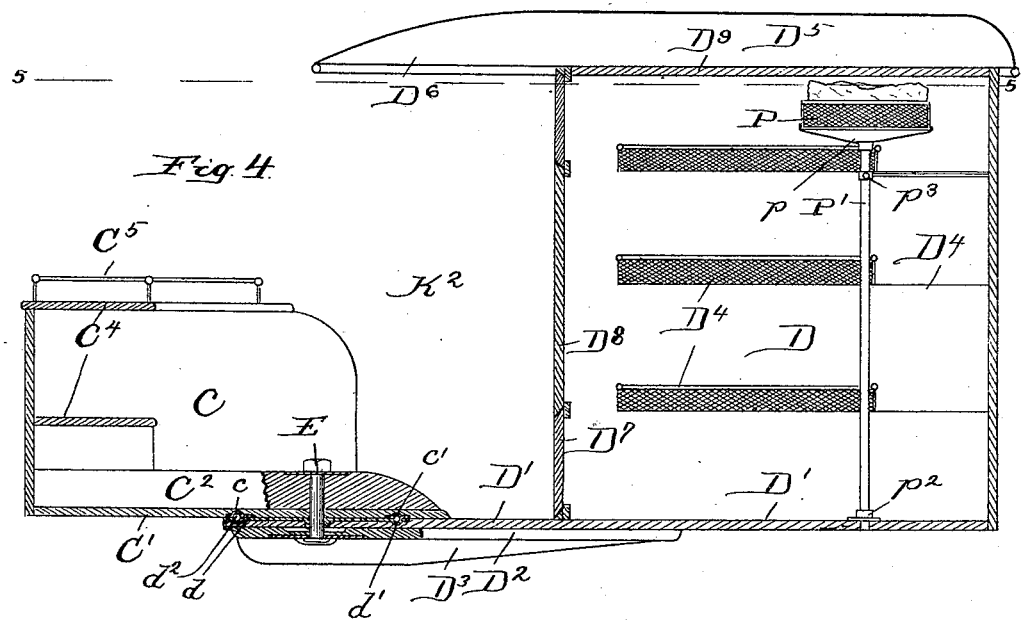
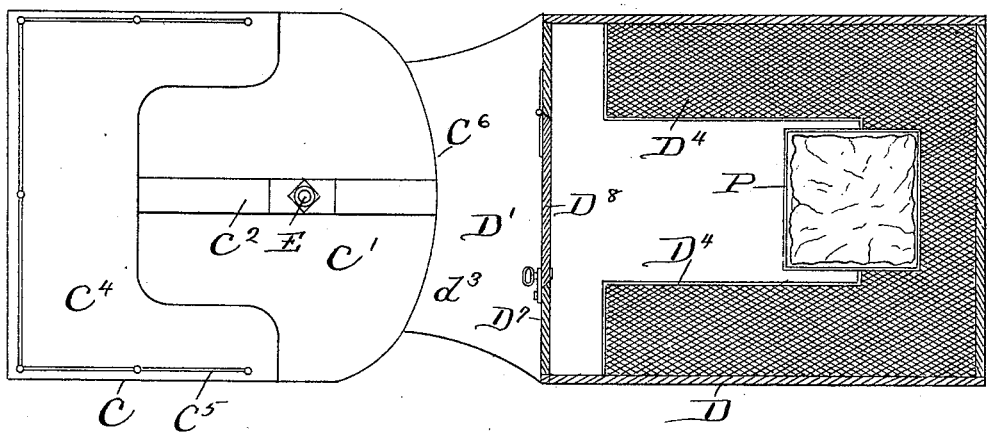
Witnesses:
Lew E. Curtis
H. M. Munday
Inventor:
Samuel D. Reynolds
By Munday, Evarts & Adcock
his Attorneys

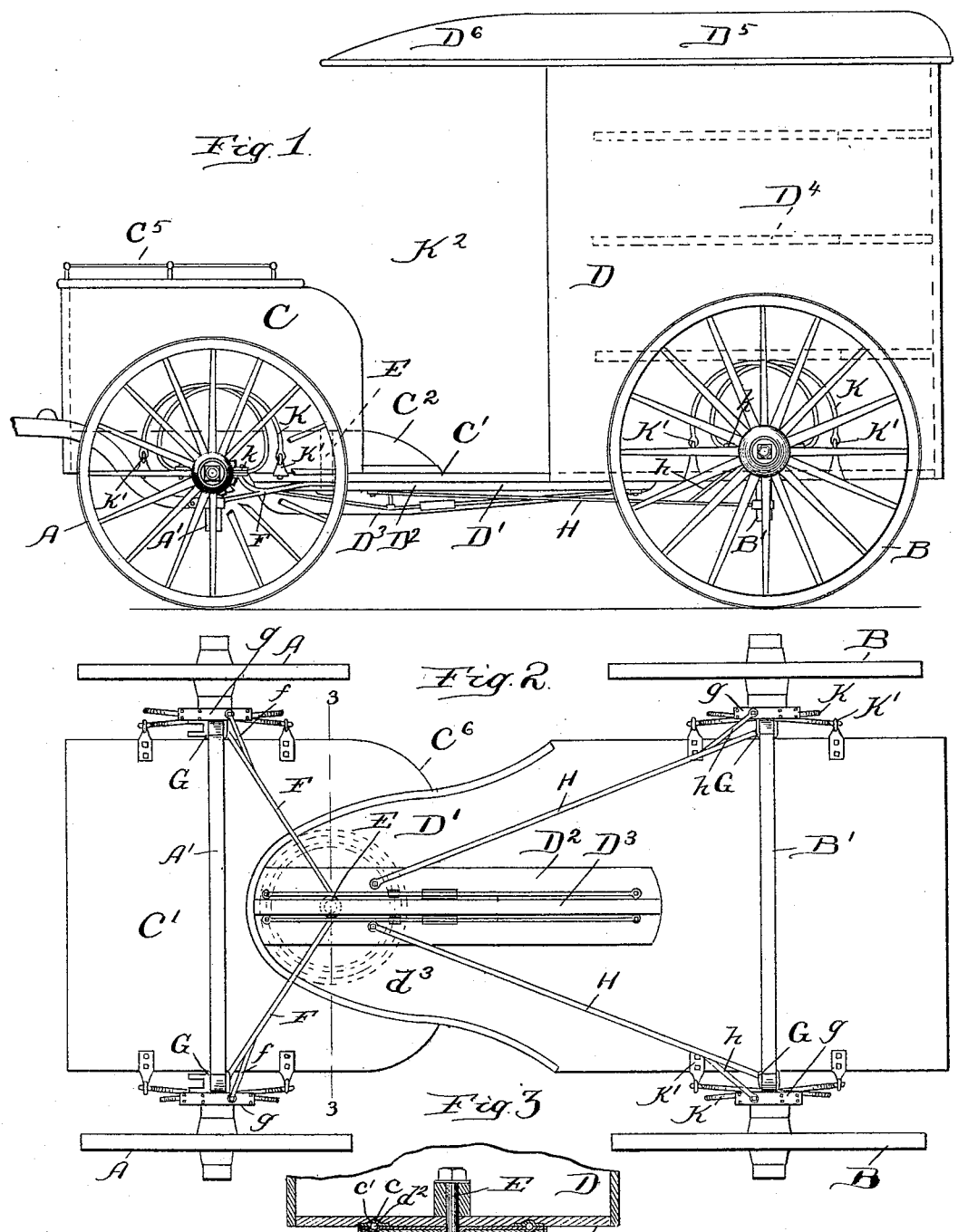

UNITED STATES PATENT OFFICE.

SAMUEL D. REYNOLDS, OF ROCHELLE, ASSIGNOR TO CHARLES E. BRADT, M. D. SHIPMAN, AND S. E. BRADT, OF DE KALB, ILLINOIS.

DELIVERY-WAGON.

SPECIFICATION forming part of Letters Patent No. 500,212, dated June 27, 1893.

Application filed December 7, 1892. Serial No. 454,334. (No model.)

*To all whom it may concern:*

Be it known that I, SAMUEL D. REYNOLDS, a citizen of the United States, residing at Rochelle, in the county of Ogle and State of Illinois, have invented a new and useful Improvement in Delivery-Wagons, of which the following is a specification.

My invention relates to wagons designed to be used for delivering groceries, meats and other articles.

The object of my invention is to provide a delivery wagon of a strong, simple and durable construction, which will have the double advantage, at the same time, of turning short and being low down and easy to get into, which two conditions or requirements have not heretofore been combined together in delivery wagons of the old or ordinary construction. To secure this result I divide the wagon body into two sections, mount one section upon the bent axle of the front wheels and the other section upon the bent axle of the hind wheels, and pivot the two sections or parts together by a king bolt located between the axles, the floors or bottoms of one section overlapping that of the other. Each section of the wagon body is located centrally over its axle, so that the load in each section of the body comes centrally over its axle like the load of a two-wheeled cart. In one sense my delivery wagon may be considered as two two-wheeled carts pivoted together at their bottoms or floors by a king bolt intermediate between the two axles. The sides of the wagon body are open at each side between the wheels so as to give ample room for the driver or delivery man to step in and out with ease at either side. The floor or bottom of the hind section of the wagon may be narrowed between the wheels to give greater facility for stepping in and out and also to give additional room for turning or cramping the front wheels short. As each section of the wagon is practically balanced over its axle there is little tendency for the bottom of the wagon to sag or tend to bind upon the king bolt. However to insure against undue friction in turning or cramping the front wheels, I provide a fifth wheel ring furnished with balls, or other anti-friction bearings.

In the accompanying drawings which form a part of this specification, Figure 1 is a front elevation of a delivery wagon embodying my invention. Fig. 2 is a bottom view. Fig. 3 is a vertical cross section on line 3—3 of Fig. 2. Fig. 4 is a central longitudinal vertical section. Fig. 5 is a horizontal section taken on line 5—5 of Fig 4.

In the drawings similar letters of reference indicate like parts throughout all the figures.

In said drawings A A represent the front wheels, A' the front bent axle, B B the rear wheels and B' the bent axle thereof.

C is the front section or portion of the wagon body and D is the rear section or portion of the wagon body. The floors or bottoms C' D' of these two sections of the wagon body overlap each other between the front and rear axles and are pivoted together there by a king bolt E.

The front section C of the wagon body is strengthened and stiffened by a central longitudinal rib or beam $C^2$ preferably of wood and through which the king bolt E extends. The bottom or floor D' of the rear section of the wagon body is similarly strengthened by a central longitudinal plank or plate $D^2$ of wood or metal, and a central longitudinal rib or beam $D^3$. Secured on the upper face of the bottom or floor D' is a fifth wheel ring or plate d surrounding the king bolt; and secured to the under face of the floor C' of the other section is a corresponding ring c, these rings c and d having preferably ball bearing grooves c' d' in which fit the bearing balls $d^2$. In place of these ball bearings other equivalent anti-friction bearings may be used.

F F are braces pivoted at one end to the king bolt E and secured at their opposite ends to the clips G which are attached to the axle at the lowermost or bent portion of the axle. The braces F F have branches f f which are secured by clips g to the axle at the level of the hub. The two branches of the braces F, secured to the bent axle at different levels, thus form a perfect brace and prevent any tendency of the axle to turn or change position.

Braces H secured at their front ends to the bottom D' of the rear section of the wagon body and secured at their rear ends to the bent axle B' by clips G G serve to strengthen the rear section of the wagon body. These braces H have branches $h$ the same as the front braces F and which are secured by clips $g\ g$ to the rear axle at the level of the hubs.

Each section of the wagon body C D is supported on springs K which are secured by clips $k\ k$ to the axles A' and B'. Each of these springs K is preferably a reciprocating or double spring having two points of attachment K' K' to the wagon body, one point in front of the axle and one at the rear thereof, so as to better balance and support each section C, or D of the wagon body above its respective axle. Each of these double or reciprocal springs K consist preferably of two curved spring rods, one end of each spring rod being securely clamped between the parts of the clip $k$ and the other curving in a substantially half-circle over or around the axle and being attached at its other end to the body C or D on the opposite side of the axle.

Each section C or D of the wagon body is provided with shelving or receptacles $C^4\ D^4$.

The front section C of the wagon body is preferably made comparatively low and its top or upper shelf $C^4$ should be furnished with a marginal rail $C^5$ to prevent packages from falling off which may be placed on top.

The bottom or floor C' of the front section of the wagon is made preferably to overlap the extended tongue of the bottom D' of the rear section. And this overlapping bottom C' of the front section should have a substantially circular or semi-circular end $C^6$, so that as the front wheels are turned or cramped, this rear circular end $C^6$ will preserve its outline or position and thus not engage or disturb any article that may be placed on the under floor D' of the rear section of the body.

The rear section D of the wagon body has its bottom or floor D' narrowed at $d^3$ to give room for the front wheels in turning. This feature in connection with the intermediate pivot E for the two sections of the wagon body enables the wagon to be turned extremely short as the act of turning the front wheels in one direction also throws the rear wheels in the opposite direction and thus increases the angle between the front and rear axles in the act of turning, and enables the front wheels to turn much shorter as the portion $d^3$ of the bottom D is carried out of the way of the wheels because of the swinging movement of the intermediate pivot E.

My delivery wagon with its body made in two parts pivoted together by an intermediate pivot may thus be turned almost like a single cart. In other words my delivery wagon consisting as it practically does of two carts connected together by an intermediate pivot will turn almost like a single two wheeled cart.

The rear section or portion D of the wagon body is preferably inclosed by a cover or top $D^5$ having an extension or hood $D^6$ which projects forward over the intermediate space $K^2$ between the two sections C D of the body and which space is or may be occupied by the driver. The rear section D may also, especially for some uses, be furnished with a closed front $D^7$ which is furnished with a hinged door $D^8$. This door $D^8$ may have beveled edges so that it will close practically air tight, especially where the wagon is to be used as a refrigerator in delivering or peddling butcher's stock. For this purpose I also provide the wagon with a removable wire basket or ice receptacle P supported on an iron pipe P' extending to and through the floor D', so that this pipe will serve also as a drip pipe as well as a support for the ice. The ice receptacle P may preferably be made dish shaped. It of course has a tight bottom $p$. The basket P which holds the ice may preferably be made of wire and may be set in and lifted out at pleasure by the operator. The standard P' fits in a socket $p^2$ in the bottom of the floor and may likewise be removed. It is secured by clips $p^3$ to the shelf $D^4$. Underneath the top $D^5$ of this rear portion D of the wagon body, especially where it is to be used like a refrigerator, I provide it with a secondary or supplemental closed top $D^9$ thus leaving an air space between this supplemental top and the roof or top $D^5$.

I claim—

1. A delivery wagon body consisting of two sections C and D, the floor of one section overlapping that of the other section and pivoted together so that they will turn freely upon each other, substantially as specified.

2. In a delivery wagon, the combination of the front and rear axles, with a body supported thereby consisting of a front and rear portion pivoted together between the axles and provided with open spaces at the sides to give easy access thereto, substantially as and for the purpose set forth.

3. A delivery wagon having front and rear axles and a body supported thereon, and consisting of two sections C D pivoted together between the axles, substantially as specified.

4. In a delivery wagon, the combination with the forward and rear axles A' B' of the front body portion C having a low down floor or bottom C' and a rear body portion D having a floor or bottom D', said floors C' D' overlapping each other and being pivoted together between the axles, said bottoms C' D' being furnished with strengthening ribs or beams, substantially as specified.

5. In a delivery wagon, the combination with bent forward and rear axles A' B', of a front body portion C having a low down floor or bottom C' and a rear body portion D having a low down floor or bottom D', said floors C' D' overlapping each other and pivoted together between the axles by a king bolt, said bottoms C' D' being furnished with longitudinal strengthening ribs or beams, and braces F F extending from the front axle to the king bolt, substantially as specified.

6. In a delivery wagon, the combination with the forward and rear axles A' B' of a front body portion C having a low down floor or bottom C' and a rear body portion D having a low down floor or bottom D', said floors C' D' one overlapping the other and pivoted together between the axles by a king bolt, said bottoms C' D' being furnished with longitudinal strengthening ribs or braces, and braces H H extending from the rear axle to said floor D', substantially as specified.

7. In a delivery wagon, the combination with bent forward and rear axles A' B', of a front body portion C having a low down floor or bottom C' and a rear body portion D having a low down floor or bottom D', said floors C' D' overlapping each other and pivoted together between the axles by a king bolt, said bottoms C' D' being furnished with longitudinal strengthening ribs or beams, and braces F F extending from the front axle to or near the king bolt, said braces F F having branches $f f$ secured to the bent axle at a different level from the main braces F F, substantially as specified.

8. In a delivery wagon, the combination with an axle A' and a rear axle B' of a body made in two sections or parts C D pivoted together between the axles, each of said parts C and D being centrally located over their respective axles, substantially as specified.

9. In a delivery wagon, the combination with an axle A' and a rear axle B' of a body made in two sections or parts C D pivoted together between the axles, each of said parts C and D being centrally located over their respective axles, the rear portion D of said wagon body being provided with an inclosed chamber, substantially as specified.

10. In a delivery wagon, the combination with a front axle A' and a rear axle B' of a body made in two sections C D pivoted together between the axles, each of said parts C and D being centrally located over their respective axles, the rear portion D of said wagon body being provided with an inclosed chamber, and an ice basket or receptacle P, substantially as specified.

11. In a delivery wagon, the combination with front axle A' of rear axle B', a low down body supported thereon and consisting of a front portion C and a rear portion D having floors or bottoms C' D' pivoted together between the axles, with open spaces K K at the sides to give easy access thereto, substantially as specified.

12. In a delivery wagon, the combination with front axle A' of rear axle B', a low down body supported thereon and consisting of a front portion C and a rear portion D having floors or bottoms C' D' pivoted together between the axles, said floors C' D', one overlapping the other, and being provided with fifth wheel rings $c\,d$, substantially as specified.

13. In a delivery wagon, the combination with front axle A' of rear axle B', a low down body supported thereon and consisting of a front portion C and a rear portion D having floors or bottoms C' D' pivoted together between the axles, said floors C' D' one overlapping the other, and being provided with fifth wheel rings $c\,d$ and bearing balls $b^2$, substantially as specified.

14. In a delivery wagon, the combination with front axle A' of rear axle B', a body supported thereon and consisting of a front portion C and a rear portion D, having floors or bottoms C' D' pivoted together between the axles with open spaces K K at the sides to give easy access thereto, the overlapping floor C' having a circular rear end, substantially as specified.

SAMUEL D. REYNOLDS.

Witnesses:
H. M. MUNDAY,
LEW. E. CURTIS,